UnitedStates Patent Office 3,051,710
Patented Aug. 28, 1962

3,051,710
GLYCOLIC ACID AMIDE DERIVATIVES OF PIPERAZINE AND USE THEREOF
John H. Biel, Milwaukee, Wis., assignor to Lakeside Laboratories, Inc., Milwaukee, Wis., a corporation of Delaware
No Drawing. Filed Dec. 21, 1959, Ser. No. 860,653
6 Claims. (Cl. 260—268)

This invention relates to piperazine derivatives. More particularly, this invention is concerned with 1-(beta,beta-dicyclic acetyl)-piperazines, processes of preparing such compounds, novel intermediates useful in such processes, and uses for the compounds.

This application is a continuation-in-part of my copending application Serial No. 716,048, filed February 19, 1958, now abandoned.

According to the present invention it has been discovered that compounds of the formula

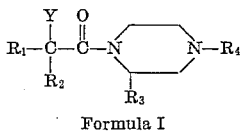

Formula I wherein $R_1$ is a phenyl, cyclohexyl, thienyl, furyl, halophenyl (chlorophenyl), lower alkoxy-phenyl(methoxyphenyl), or lower alkyl-phenyl(methylphenyl) group, $R_2$ is a phenyl, cyclohexyl, 2-thienyl or cyclopentyl group, $R_3$ is hydrogen or methyl, and $R_4$ is hydrogen, an alkyl group, particularly lower alkyl groups including methyl, ethyl, propyl, butyl, pentyl, hexyl and the like, aryl groups, particularly monocyclic aryl groups such as the phenyl group and nuclear substituted phenyl groups such as hydroxyphenyl, lower alkoxy phenyl, halophenyl groups such as the chlorophenyl group and lower acyloxy phenyl groups such as the acetoxyphenyl group, aralkyl groups, particularly those in which the aryl moiety is monocyclic and the alkyl moiety is a lower alkyl group such as benzyl, phenethyl, phenylpropyl and chlorophenylpropyl, hydroxy alkyl groups such as hydroxyethyl, hydroxymethyl, and 2-hydroxyisopropyl, hydroxyethoxyalkyl groups, acetoxyalkyl groups, propionoxyalkyl groups, benzyloxyalkyl groups, benzyloxyethyl and diphenylchloroacetoxy lower alkyl groups, Y is a hydroxy, halo, preferably chlorine or bromine, or acyloxy group such as derived from a carboxylic acid, as the monocarboxylic aliphatic and omega phenyl-aliphatic acids such as those which yield the acetoxy, propionoxy, benzoyloxy, and phenylacetoxy groups, advisably in the form of nontoxic acid addition salts thereof, exert a pronounced psychotherapeutic effect, including mental relaxation, when administered to animals and humans.

The compounds of Formula I in which Y is a halogen or acyloxy group hydrolyze when administered to animals and the groups represented by Y are converted to hydroxy groups.

It has also been discovered that the compounds of Formula I are useful as antagonists to the psychotogenic substances described in my copending application Serial No. 704,247, filed December 23, 1957, which has matured into Patent No. 2,995,492. In addition, it has been found that these compounds are useful in ameliorating or removing hallucinations of schizophrenics. Furthermore, the compounds, being tertiary bases, can be used to recover and purify penicillin with which they form salts.

The compounds of Formula I are all considered novel except for those in which $R_1$ and $R_2$ are each phenyl, Y is hydroxy, $R_3$ is hydrogen and $R_4$ is a lower alkyl group. These old compounds are shown in Monatschefte für Chemie 85, 1217 (1954).

The production of these compounds, except those in which $R_4$ is a hydroxyalkyl group, is readily achieved by reacting an appropriate dicyclic-alpha-halo or acyloxy acetyl halide with piperazine or a 4-substituted piperazine to form an intermediate 1-(dicyclic-alpha-halo or acyloxy acetyl)-piperazine which is readily hydrolyzed to the corresponding 1-(dicyclic-alpha-hydroxy acetyl)-piperazine. This process may be represented as follows:

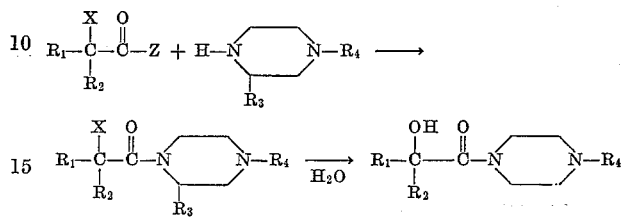

wherein $R_1$, $R_2$, $R_3$ and $R_4$ have the significance previously assigned, X is an acyloxy group or halogen, and Z is a reactive halogen.

Representative dicyclic-alpha-halo or acyloxy acetyl halides which may be used in this process are diphenylchloro acetyl chloride, phenylcyclohexylchloroacetyl bromide, dicyclohexylchloroacetyl chloride, cyclopentylcyclohexyl bromoacetyl bromide, phenyl 2-thienyl chloroacetyl chloride, chlorophenylcyclohexylacetyloxy acetyl chloride and diphenyl phenylacetyloxy acetyl chloride.

In addition to piperazine, 1-substituted derivatives thereof may be used in the process as reactants including 1-methylpiperazine, 1-ethylpiperazine, 1-benzylpiperazine, 1-phenylethylpiperazine, 1-phenylpiperazine, 1-(acetoxyethyl)-piperazine, 1-(propionyloxypropyl)-piperazine, 1-(diphenyl)-glycolyloxyethyl) - piperazine, 1 - (diphenylchloroacetoxypropyl)-piperazine, and 1-(hydroxyalkyl)-piperazines in which the hydroxy group is protected, as in the form of a benzyloxy ether, such as 1-(benzyloxyethyl)-piperazine.

In the first step of this process the reactants are conveniently brought together in an inert organic solvent such as benzene, toluene, isopropanol, or acetone. An acid acceptor is generally added to remove the released hydrohalide. Generally equimolar quantities of reactants are used although with the piperazine ($R_4$=H), it is advisable to use a 100 to 200% excess so as to avoid bis-substitution. Elevated temperatures up to the reflux temperature are generally employed to enhance the rate of reaction and maintain solubility of the reactants. After the reaction is terminated the desired 1-(dicyclic-alpha-halo or acyloxy acetyl)-piperazine may be readily recovered from the reaction mixture by conventional methods.

Some of the compounds which may be produced in this way are 4-methyl-1-diphenylchloroacetyl piperazine, 4-benzyl-1-(phenylcyclohexylchloroacetoxy ethyl)-piperazine, 4-phenyl-1-(phenyl-2-thienyl chloroacetoxyethyl)-piperazine, 4-acetoxyethyl-1-(dicyclohexylbromoacetoxyethyl)-piperazine, and 4-benzyloxypropyl-1-(2'-diphenylbromoacetoxy-2'-methyl ethyl)-piperazine.

Hydrolysis of the 1-(dicyclic-alpha-halo or acyloxyacetyl)-piperazine to the desired 1-(dicyclic glycolyl)-piperazine is readily achieved with water, advisably in the presence of an aqueous mineral acid.

As previously stated those compounds in which $R_4$ is a hydroxyalkyl group are not prepared directly by the described process. Instead a 4-hydroxyalkyl piperazine which has the hydroxy group protected, or which will yield the hydroxy group upon suitable treatment is used as a reactant in the process. One suitable procedure is to convert the 4-hydroxyalkyl-piperazine to the corresponding 4-(benzyloxyalkyl)-piperazine or 4-(benzhydryloxyalkyl)-piperazine and use one such compound in the described process. The bonzyloxy group or benzhydryloxy group then may be cleaved by catalytic hydrogenation to the hydroxyalkyl derivative as follows:

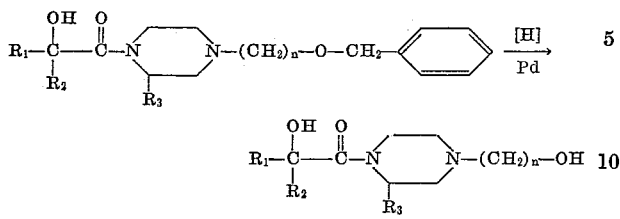

wherein $R_1$, $R_2$ and $R_3$ have the significance previously assigned and $n$ is an integer from 2 to 10. Palladium is a suitable catalyst for hydrogenation. Low pressures of about 50 to 100 p.s.i. may be used. The hydrogenation is advisably effected by dissolving the base, generally as a salt, in a suitable alcohol such as methanol or ethanol. After the reaction is terminated the desired product may be recovered by conventional methods.

Acid addition salts of all of the novel compounds within the scope of this invention are produced by contacting the tertiary base with a suitable acid such as a mineral acid, for example, sulfuric acid or hydrochloric acid, or an organic acid such as maleic acid, fumaric acid, acetic acid or citric acid. The acid addition salts of the compounds of Formula I in which Y is a halogen or acyloxy group are formed in the absence of water to avoid hydrolysis of these groups to the hydroxy group.

The compounds of Formula I are generally formulated into suitable pharmaceutical forms for administration to animals and humans for the described purposes. The preferred route of administration is oral and for this route unit dosage compositions such as tablets or capsules are ordinarily recommended. Unit-dosages can contain from about 2.5 to 30 mgm. or more of the active agent and may be administered once or more a day or at other suitable intervals according to the condition of the animal or patient.

Any suitable pharmaceutical carriers may be used with one or more of the active compounds to achieve a more practical volume for a unit-dosage. Sugar, starch and talc are suitable solid carriers which may be used in forming tablets and capsules. However, liquid carriers such as water also may be used as desired.

The following examples illustrate the preparation of specific compounds within the scope of this invention.

EXAMPLE 1

*4-Methyl-1-Diphenylchloracetyl Piperazine*

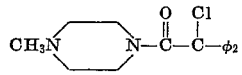

To 20 g. (0.20 mole) of 4-methylpiperazine dissolved in 100 cc. of benzene was added 26.5 g. (0.10 mole) of diphenylchloracetyl chloride. The mixture was stirred and refluxed for one hour. The 4-methylpiperazine hydrochloride was removed by filtration and the filtrate washed repeatedly with water until the pH of the solution was neutral. The benzene layer was dried with potassium carbonate, the latter removed by filtration and the filtrate diluted with 100 cc. of acetone. To the benzene-acetone solution of 4-methyl-1-diphenylchloracetyl piperazine was added 38 cc. of a 2.71 N ethereal HCl solution. The precipitate was isolated by filtration and 22 g. (61%) of the hydrochloride salt obtained, M.P. 229-231° C. dec.

*Analysis.*—Calcd. for $C_{19}H_{22}Cl_2N_2O$: Cl, 19.17; N, 7.67. Found: Cl, 18.93; N, 7.74.

EXAMPLE 2

*4-Methylpiperazinyl Benzilamide Hydrochloride*

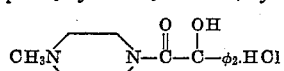

Seven gms. of the alpha-chloro compound in Example 1 were recrystallized twice from 35 cc. of boiling water, yield 6.0 g., M.P. 260-261° C.

*Analysis.*—Calcd. for $C_{19}H_{23}ClN_2O_2$: Cl, 10.25; N, 8.09. Found: Cl, 10.21; N, 8.07.

EXAMPLE 3

*4-(Beta-Diphenylchloracetoxyethyl)-Piperazinyl Diphenylchloracetamide and Hydrochloride Thereof*

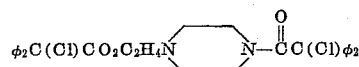

To 53 g. (0.20 mole) of alpha-chlorodiphenylacetyl chloride in 100 cc. of benzene was added 13.0 g. (0.10 mole) of 4-hydroxyethylpiperazine dissolved in 100 cc. of benzene and 20 g. (0.20 mole) of triethylamine. After the exothermic reaction had ceased, the mixture was stirred and refluxed for four hours. The triethylamine hydrochloride was removed by filtration, the filtrate concentrated to dryness in vacuo and the residue dissolved in acetone. The acetone solution of 4-(beta-diphenylchloracetoxyethyl)-piperazinyl diphenylchloracetamide was acidified to pH 2 with ethereal hydrochloric acid and the hydrochloride salt isolated by filtration, yield 23 g.; M.P. 206-208° C. dec.

*Analysis.*—Calcd. for $C_{34}H_{33}Cl_3N_2O_3$: Cl, 17.01; N, 4.49. Found: Cl, 16.12; N, 4.44.

EXAMPLE 4

*4-(Beta Benzyloxyethyl)-Piperazinylbenzylamide.HCL*

Five g. (0.008 mole) 4-(beta-diphenylchloracetoxyethyl)-piperazinyl diphenylchloracetamide.HCL suspended in 150 cc. hot water was boiled but did not dissolve. It was filtered hot and washed with hot water. The precipitate was dried. Yield 3.6 g., M.P. 238-239° C. (dec.)

*Analysis.*—Calcd. for $C_{34}H_{35}O_5N_2Cl$: N, 4.76; Cl, 6.05. Found: N, 4.92; Cl, 6.99.

Various changes and modifications of the invention can be made and, to the extent that such variations incorporate the spirit of this invention, they are intended to be included within the scope of the appended claims.

What is claimed is:

1. A member of the group consisting of compounds of the formula

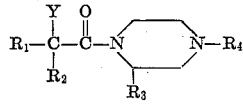

and nontoxic acid addition salts thereof, wherein $R_1$ is a member of the group consisting of phenyl, cyclohexyl, thienyl, furyl, halophenyl, lower alkoxy-phenyl, and lower alkyl-phenyl groups, $R_2$ is a member of the group consisting of cyclohexyl, 2-thienyl and cyclopentyl groups, $R_3$ is a member of the group consisting of hydrogen and the methyl group, and $R_4$ is a member of the group consisting of hydrogen, lower alkyl, phenyl, phenyl-lower alkyl, hydroxy-lower alkyl, acyloxy-lower alkyl, benziloxy-lower alkyl, phenyl-lower acyloxyalkyl and diphenylchloroacetoxy-lower alkyl groups and Y is a member of the group consisting of hydroxy, halo, acyloxy groups from lower aliphatic monocarboxylic acids, benzoyloxy and phenylacetoxy.

2. 4 - (omega-diphenylhaloacetoxy-lower alkyl)-piperazinyl diphenylhaloacetamide.

3. 4 - (beta-diphenylchloroacetoxyethyl)-piperazinyl diphenylchloroacetamide.

4. 4-(beta-benziloxyethyl)-piperazinylbenzilamide.

5. A compound of the formula

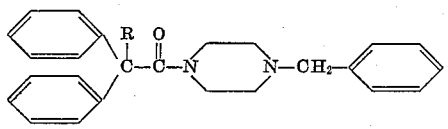

wherein R is selected from the group consisting of chlorine and hydroxy.

6. A member of the group consisting of compounds of the formula

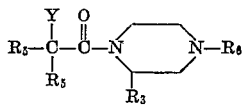

and nontoxic acid addition salts thereof, wherein $R_3$ is a member of the group consisting of hydrogen and methyl, $R_5$ is phenyl, $R_6$ is a member of the group consisting of phenyl, phenyl-lower alkyl, hydroxy-lower alkyl, acyloxy-lower alkyl groups in which the acyloxy is from a lower aliphatic monocarboxylic acid, benziloxy-lower alkyl, phenyl-lower acyloxyalkyl in which the acyloxy is from a lower aliphatic monocarboxylic acid, and diphenyl-chloroacetoxy-lower alkyl, and Y is a member of the group consisting of hydroxy, halo, acyloxy groups from lower aliphatic monocarboxylic acids, benzoyloxy and phenylacetoxy.

References Cited in the file of this patent

Zaugg et al.: Jour. Amer. Chem. Soc., vol. 72 (1950), pages 3004–3007.

Hromatka et al.: Monatschefte für chemie, pages 1216–1222, vol. 85 (1954).

UNITED STATES PATENT OFFICE
CERTIFICATE OF CORRECTION

Patent No. 3,051,710                                  August 28, 1962

John H. Biel

It is hereby certified that error appears in the above numbered patent requiring correction and that the said Letters Patent should read as corrected below.

Column 1, line 28, for "phenyl," read -- phenyl) --; lines 43 and 44, for "benzyloxyalkyl" read -- benziloxyalkyl --; column 2, lines 14 to 16, the right-hand portion of the formula should appear as shown below instead of as in the patent:

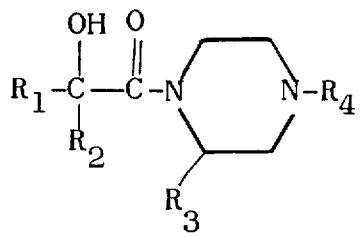

column 2, line 58, for "4-benzyloxypropyl-" read -- 4-benziloxypropyl- --; column 3, line 1, for "bonzyloxy" read -- benzyloxy --; column 4, line 30, for "4-(Beta Benzyloxyethyl)-Pierazinylbenzylamide.HCL", in italics, read -- 4-(Beta-Benziloxyethyl)-Piperazinylbenzilamide·HCl --, in italics; line 32, for "diphenylchloracetamide.HCL" read -- diphenylchloracetamide.HCl --.

Signed and sealed this 25th day of December 1962.

(SEAL)
Attest:

ERNEST W. SWIDER                              DAVID L. LADD
Attesting Officer                            Commissioner of Patents